United States Patent Office 2,976,176  
Patented Mar. 21, 1961

2,976,176
SEALING POROUS METAL SURFACES

Christ F. Parks, Tulsa, Okla., assignor to The Dow Chemical Company, Midland, Mich., a corporation of Delaware No Drawing. Filed Sept. 22, 1958, Ser. No. 762,216

14 Claims. (Cl. 117—97)

The invention relates generally to a novel resin composition and to a method employing such resin composition for sealing the pores of metal.

Resin compositions varying widely in percentage composition and in types of component and properties are known. A wide variety of uses therefor have been discovered. Among such resin compositions are the phenol-aldehyde type. One of the uses for such resin compositions is the sealing of porous metal castings. Quite often in the manufacture of metal castings small pin point pores or holes occur due to metal shrinkage in the final stages of the casting operation. These pores are sometimes not discovered until the casting has been machined into a finished product. It is desirable and often essential that such metal be impervious to the passage of fluids therethrough. One method of attaining this end is closing the pores by welding. When pores occur at inaccessible points where welding cannot be used to close them, a sealant may be used.

The sealing of the pores of metal castings has presented a particularly serious problem. Because of the hydraulic pressures which the castings may have to withstand, the sealant thereof must be highly resistant to cracking and shrinking generally. It is also desirable that compositions used for sealing metals be substantially free from obnoxious odors before, during, and after application while the resin is setting or hardening.

Compositions heretofore employed for sealing metal castings have not been fully satisfactory because they have failed to meet one or more of the requirements for such a sealing, some of which requirements are set out above. Resin type materials in liquid state which may be set to the solid state have been found to possess certain properties which are desirable in such coatings. However, their use has associated therewith a number of objections.

Phenol-aldehyde resins which are commonly known are usually prepared by condensing a molar ratio of 1 phenol to 1.5 formaldehyde. The stoichiometric quantities required and the condensation product formed would indicate that a 1:1 molar ratio would be the preferred one for the reactants. However, it had been shown that a 0.5 mole of formaldehyde in excess of the stoichiometric requirement is necessary to form a product having satisfactory setting characteristics for sealing metal. However, during the setting reaction odoriferous and toxic fumes are generated, presumably largely by the evolving excess formaldehyde. Elaborate ventilating equipment must be provided to overcome the hazard thus created. Even with the provision of the ventilating equipment, the toxic effect of both the liquid composition and the fumes are not entirely eliminated.

In the preparation of phenol-formaldehyde resins rather large amounts of water are produced by the condensation reaction. The separation of this quantity of water sharply reduces the product yield. A way of overcoming the low yield of resin because of the water produced during the condensation reaction has so far escaped a satisfactory solution therefor. The disposal of the water thus formed also constitutes a problem.

Accordingly, the principal objects of the invention are to provide a sealing composition and method of sealing pores occurring in metal, e.g., castings, therewith which obviate to a large extent the objections to sealing compositions heretofore known.

The manner by which these and related objects are attained will be made clear in the ensuing description and is particularly pointed out and defined in the appended claims.

The instant invention is based upon the discovery that a resin composition prepared by admixing phenol, a lower alkyl aldehyde, a cyclic aldehyde, an alkali metal salt of lignin or of sulfonated lignin and an acid catalyst under suitable reaction conditions, yields a composition suitable for providing an improved sealing composition for porous metals, particularly metal castings. The alkyl aldehyde usually employed is formaldehyde and the cyclic aldehyde is furfural.

The steps illustrative of a preferred mode of practicing the invention are set out in the simplified flow diagram below:

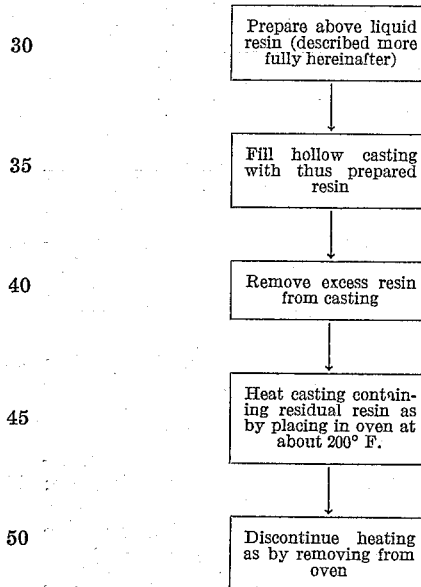

In the practice of the invention it is usual to test the hollow casting prior to treatment to ascertain the extent of the leaks therein. The test most commonly performed is to fill the casting with water and place it under pressure for a time. It is also usual to test again the casting after treatment to make sure that a satisfactory seal has been obtained. If it has not, the steps of the flow diagram may be repeated.

The resin composition of the instant invention produces less water of separation during condensation, markedly less obnoxious fumes and provides a better seal of the metal pores than heretofore known compositions.

The alkali metal salt of lignin usually employed is sodium lignate and the sulfonated lignin employed is sodium lignosulfonated. These compounds of lignin are readily available on the market, most commonly in an unrefined state. The commercially available unrefined lignate and lignosulfonate salts offer advantages in costs and are fully satisfactory for the practice of the invention. They usually contain lesser amounts of other materials. For example, the sodium lignate may contain some sodium carbonate and other free salts. The lignosulfonates may contain some unreacted lignin and sometimes sulfonic acid.

The sodium lignate, sometimes referred to broadly as alkali lignin, is commonly prepared from the black liquor formed as a by-product during the commercial wood-pulping operations employing either the sulfate process (also known as the kraft process) or the soda process. The sulfate and the soda processes are similar but differ in that the sulfate process employs an aqueous solution of both $Na_2S$ and $NaOH$, whereas the soda process employs chiefly only the $NaOH$ solution. Both employ sulfuric acid in a revivification step from which the term "sulfate" is derived. In either process, an alkali lignin is formed. Alkali lignin is insoluble in organic acids and organic hydrocarbons and substantially insoluble in water, although it is dispersible therein to the extent of about 95 percent. Unrefined sodium lignate for industrial use is usually a free-flowing brown powder. Examples of commercially available alkali lignins made from the spent black liquor of pine wood sulfate pulping operations, and which are suitable for the practice of the invention, are Indulin B and Indulin C which have the following properties:

| Components or Characteristics | Indulin B | Indulin C |
| --- | --- | --- |
| General type | A purified sodium lignin. | A sodium salt of lignin. |
| Sodium, percent | About 4.0 | About 9.1. |
| pH value | 8.5 | 9.3. |
| Methoxy, percent | 12.7 | 11.5. |
| Moisture, percent | 7.4 | 8.3. |
| Ash, percent | 9.2 | 22.5. |
| Sulfur, percent | 1.4 | 1.8. |
| Apparent density, lb./ft.$^3$ | 30.0 | 30.0. |
| Specific gravity | 1.6 | 1.6. |

Alkali metal lignosulfonates suitable for the practice of the invention are best illustrated by the sodium salt of lignosulfonic acid made from the spent liquor produced during pulping operations employing the sulfite process. The sulfite process differs from the above briefly-described sulfate and soda processes in that an aqueous solution of a bisulfite, e.g., $NaHSO_3$, and sulfur dioxide are employed in the sulfite process. The sodium lignosulfonate product thus produced is predominantly the metal salt of sulfonated lignin. The sulfur content thereof is usually between 8 and 12 weight percent.

Examples of commercially available sodium lignosulfonates suitable for the practice of the invention are: Marasperse N, Polyfon F and Polyfon H.

The preparation of both an alkali metal lignate and an alkali metal lignosulfonate and the characteristics of such products are described in Wood Chemistry, 2nd Edition, by Wise and Jahn, under the chapter headed "Chemistry of Lignin" contributed by Brauns as a part of the American Chemical Society Monograph Series.

The invention is particularly directed to the sealment of the pores in castings which must be substantially fluid-tight. Castings which are contemplated to be treated in accordance with the invention may be of steel, aluminum, cast iron, bronze, copper or any other metal or alloy having pores requiring sealment thereof.

In practicing the invention, the molar ratio of reactants employed to yield the resin composition is 1 mole of phenol to between 1.5 and 2.5 moles of the total molar weights of alkyl aldehyde and cyclic aldehyde. The preferred ratio to employ in the preferred embodiment, for example, is 1 mole of phenol to 1.5 moles of formaldehyde plus furfural. Formaldehyde is usually employed in an amount between 1 and 1.1 moles and the furfural between 0.4 and 0.5 mole. The use of more than 0.5 mole of furfural in the resin appears not to impart any particularly valuable characteristics. On the other hand the use of more furfural than is beneficial results in longer periods of cooking and in a resin composition having somewhat less compressive strength than those prepared by employing between 0.4 and 0.5 mole of furfural. It is therefore recommended that a ratio of between 1.05 and 0.9 mole of formaldehyde and between 0.45 and 0.6 mole of furfural be used per mole of phenol.

Although lignin contains phenolic groups, the reactivity of the groups is of such small effect that it is not taken into consideration in the calculation of a phenol. The recommended amounts of the lignin salt to employ in the practice of the invention is between 8 and 30 percent, calculated on the weight of the phenol used. Stated on a pound basis, the recommended weights of the lignin salt to employ are between 0.08 pound and 0.3 pound per pound of phenol. The concentration of the lignin salt to employ is stated on a weight percentage basis rather than on a molar basis because of the uncertainty of the exact molecular weight of the lignin salts employed.

In practicing the invention employing the preferred reactants, the phenol, formaldehyde, furfural, and an acid catalyst, e.g., hydrochloric acid, are mixed together in a suitable container and brought up to the reaction temperature of between 120° and 160° F. and cooked at that temperature for from 0.5 to 4.0 hours. Usually a temperature of about 150° F. for a period of about 40 minutes, excluding the time necessary to bring the reaction mixture up to the reaction temperature, is employed. The time of heating should be carefully controlled to insure complete reaction and yet avoid its being carried too far or the product being formed becomes too viscous for penetration of the metal pores. Cooking times at 150° for less than 40 minutes have indicated incomplete reaction by the presence of unreacted aldehyde and cooking periods of over 1 hour have resulted in a viscosity which was too high for satisfactory application of the resin according to the invention.

The alkali metal lignin or lignosulfonate salt is then stirred into the mixture at the reaction temperature and maintained at that temperature for about an additional 30 minutes. Thereafter the pH of the mixture is adjusted to a value of between 4.75 and 5.25 by the addition of either HCl or NaOH. Since the mixture usually has a pH of about 7 prior to the pH adjustment, hydrochloric acid is usually necessary.

To the resin preparation is added a suitable setting catalyst, e.g., between about 8 and 10 weight percent of $K_2CO_3$ or KOH or mixtures thereof, just prior to its application on the metal surfaces to be sealed in accordance with the invention.

Suitable alkyl aldehydes, other than formaldehyde are acetaldehyde and butyraldehyde. Examples of other cyclic aldehydes than furfural which may be used in the practice of the invention are benzaldehyde, tolualdehydes (o-, m-, and p-methylbenzaldehyde) and salicylaldehyde.

Only the alkali metal lignates and lignosulfonates may be employed as the lignin salt of the invention, the sodium salt being usually used.

The practice of the invention is illustrated by the following example: phenol, formaldehyde, furfural, and hydrochloric acid in the amounts shown in the Recipe R below were admixed in a 300 gallon steam-heated kettle, brought up to the reaction temperature of 150° F. in about 10 to 15 minutes, and held at that temperature for an additional 40 minutes. Indulin C having the properties described hereinbefore, and in the amounts shown in Recipe R, were then stirred into the mixture while still at the reaction temperature of about 150° F. and maintaining that temperature for an additional 30 minutes.

Recipe R

|  | Weight in Pounds | Percent By Weight | Moles |
|---|---|---|---|
| Phenol | 1,125 | 37.7 | 1.0 |
| Formaldehyde (calculated as 37 percent by weight in water) | 973 | 32.6 | 1.0 |
| Furfural | 578 | 19.4 | 0.5 |
| Indulin C | 280 | 9.4 | (1) |
| Hydrochloric Acid (Calculated as 32 percent by weight HCl in water) | 27.6 | 0.9 | (2) |

[1] Molecular weight not accurately known.
[2] Amount is guided by that necessary to produce the desired catalytic effect.

The reaction mixture was then cooled. The pH value was determined and found to be 7. The pH was then adjusted by the addition of sufficient hydrochloric acid to bring the pH value down to 5.

A resin-setting alkaline-type catalyst was prepared as follows: 275 pounds of calcined potassium carbonate, 41 pounds of potassium hydroxide and 316 pounds of water were thoroughly mixed together in a suitable container at atmospheric conditions of temperature and pressure.

A steel casting having a volumetric capacity of about 10 gallons designated as "pump fluid end" used in oil production and transfer operations (a commercial stock item) was filled with water and subjected to a pressure of 1500 p.s.i. Water was noticed to bleed from the exterior of the casting at several points showing leaks therein. The pressure was released, the water was then drained out and the casting placed in a drying atmosphere.

The resin composition prepared according to Recipe R above was then catalyzed by the addition of 0.9 gallon of the alkaline catalyst prepared as described above to 9.1 gallons of the resin composition.

The casting described above was then filled with 10 gallons of the catalyzed resin composition and pressurized to 1500 p.s.i. and held at that pressure for 15 minutes. At the end of this time the resin was observed to be bleeding from the outside of the casting indicating that the pores therein were filled with the fluid resin composition. The pressure was then released and the excess catalyzed resin was removed from the interior of the casting by first up-ending it and draining most of the resin out and, second, washing with water which easily and completely removed the resin from the surface of the casting. The casting with its pores filled with plastic was placed in a 200° oven for 16 hours to set the fluid resin which impregnated the pores to a unitary solid. The casting was then removed from the oven, cooled, and retested in the manner aforesaid by filling it with water and subjecting it to a pressure of 1500 p.s.i. No indication of any leaks could be detected in the casting at this pressure. The pressure was then released and the water removed. The fluid tight casting was then machine finished and assembled into a pump wherein it performed without fluid leaking through the pores thereof.

During the application of the resin composition to the steel casting, the effects upon personnel involved and the condition of the atmosphere immediately surrounding the operation were carefully observed. Any fumes which evolved from the liquid resin or from the resin composition during the application, drying and setting were observed. To evaluate further the absence of obnoxious fumes or irritating effects of the composition of the invention in contrast to known resin coating compositions, the following experiment was conducted.

The areas of the stomachs of white rats were denuded of hair and the rats placed in three groups. To one group of these rats, composition A, consisting of the condensation product formed by reacting one mole of phenol, 0.5 mole of formaldehyde and 0.25 pound of sodium lignate per pound of phenol, was applied to the denuded areas. To a second group of rats, composition B, consisting of the condensation product of 1 mole of phenol and 1.5 moles of formaldehyde was painted on the denuded area of the rats. To a third group of the rats, the composition prepared according to Recipe R employed in the above example of the invention was applied to the denuded areas. Those rats to which had been applied the known composition A (phenol, formaldehyde, and sodium lignate) or known composition B (phenol and formaldehyde) suffered severe irritation to the denuded areas. Those rats to which had been applied the composition of the invention prepared according to Recipe R, no noticeable irritation resulted.

To evaluate the effect of the fumes from the resin of the invention during the sealing of castings, in contrast to known resins, additional tests were conducted as follows:

White rats were placed in each of three similar stalls having individually controlled atmospheres. Condensation product A was prepared by admixing 1 mole of phenol, 1.5 moles of formaldehyde and 0.25 pound of sodium lignate per pound and placed in one stall into which rats had been placed. Condensation product B was prepared by condensing 1 mole of phenol with 1.5 moles of formaldehyde and placed in a second stall into which rats had been placed. A condensation product was prepared in accordance with Recipe R of the invention and placed in the third stall into which rats had been placed.

The rats exposed to the atmosphere contaminated by fumes from the composition A became sick, it appearing that the functioning of a number of vital organs, e.g., stomach, lungs, and the neuromuscular system were seriously impaired. The rats became substantially completely inactive in about one hour when subjected to the fumes evolving therefrom.

The rats subjected to the fumes evolving from the composition B showed pronounced irritation and reduced activity and particularly showed a highly inflamed condition about the eyes due to the evolvement of fumes from the resin.

The rats subjected to any effects produced by the resin prepared according to Recipe R of the invention (formed by admixing 1 mole of phenol, 1 mole of formaldehyde, 1.5 moles of furfural, and 0.25 pound of sodium lignate per pound of phenol) appeared entirely unaffected by the vapors from the resin after 72 hours' exposure thereto.

An examination of the example of the invention and the tests show that no adverse physiological effects could be detected when in contact with either the liquid composition or the fumes evolving therefrom. In contrast thereto, pronounced toxic effects were produced by the known compositions, tested upon the skin, eyes, and vital internal organs of the animals.

The example of the invention also shows the highly effective sealing of porous metal castings in accordance with the invention.

Having described the invention, what is claimed and desired to be protected by Letters Patent is:

1. The composition consisting of the reaction product formed by reacting an acid-catalyzed mixture consisting of: (1) phenol, (2) an alkyl aldehyde selected from the group consisting of formaldehyde, acetaldehyde, and butyraldehyde, (3) a cyclic aldehyde selected from the group consisting of furfural, benzaldehyde, tolualdehyde and salicylaldehyde, said alkyl aldehyde being in the proportions of 0.9 to 1.05 moles per mole of phenol and said cyclic aldehyde being in the proportions of 0.45 to 0.60 mole per mole of phenol, and (4) between 8 and 30 percent of the weight of the phenol of a lignin compound selected from the alkali metal salts of lignin and sulfonated lignin.

2. A composition according to claim 1 in which the combined molar weights of the alkyl aldehyde and the cyclic aldehyde are between 1.5 and 2.5 moles per mole of phenol.

3. The method of sealing a porous metal article consisting of introducing into the pores of said article a composition consisting of the reaction product formed by admixing a lignin compound selected from the class consisting of the alkali metal salts of lignin and sulfonated lignin with the product formed by heating at condensation temperature for sufficient time to substantially interact: phenol, an alkyl aldehyde selected from the class consisting of formaldehyde, acetaldehyde, and butyraldehyde and a cyclic aldehyde selected from the class consisting of furfural, benzaldehyde, tolualdehyde, and salicylaldehyde, said alkyl aldehyde being present in the proportions of from 0.9 to 1.05 moles per mole of phenol and said cyclic aldehyde being present in the proportions of from 0.45 to 0.60 mole to 1 mole of phenol and said lignin compound being added in an amount between 8 and 30 percent of the weight of the phenol employed.

4. The method of sealing a porous metal article to provide a seal therefor consisting of introducing into the pores of said article a resin composition prepared by admixing and reacting together at a temperature between 120° and 160° F. for from 15 to 40 minutes, phenol, an alkyl aldehyde selected from the class consisting of formaldehyde, acetaldehyde, and butyraldehyde, a cyclic aldehyde selected from the class consisting of furfural, benzaldehyde, tolualdehyde and salicylaldehyde, said alkyl aldehyde being present in the proportions of from 0.9 to 1.05 moles per mole of phenol and said cyclic aldehyde being present in the proportions of from 0.45 to 0.60 mole per mole of phenol, and about 1 percent of the mixture of an acid catalyst; heating the mixture at between 120° and 150° F. for from 0.5 to 4.0 hours; admixing therewith a lignin compound selected from the class consisting of the alkali metal salts of lignin and sulfonated lignin in an amount between 0.08 and 0.30 per pound of the phenol employed; adjusting the pH value of the so reacted mixture to between 4.75 and 5.25; admixing with the resulting mixture an alkali type catalyst selected from the class consisting of alkali metal carbonates and hydroxides and mixtures thereof in an amount between about 8 and 10 weight percent of the mixture to be catalyzed; applying the so prepared mixture to the article to be sealed, removing any excess thereof; and thereafter, subjecting the thus sealed article to heat to effect setting of the mixture.

5. The method according to claim 4, wherein the alkyl aldehyde is formaldehyde.

6. The method of claim 4, wherein the cyclic aldehyde is furfural.

7. The method of claim 4, wherein the lignin compound is sodium lignate.

8. The method of claim 4, wherein the lignin compound is sodium lignosulfonate.

9. The method of claim 4, wherein the metal to be sealed is a steel casting.

10. The method of claim 4 wherein said mixture is applied by immersing the metal article to be sealed into a body of the mixture and thereafter subjecting one side of the article to a greater pressure than the other side to force the mixture into the interior of the metal.

11. The method of sealing a hollow porous metal article consisting of the steps of: partially condensing a phenol, an alkyl aldehyde selected from the class consisting of formaldehyde, acetaldehyde, and butyraldehyde, a cyclic aldehyde selected from the class consisting of furfural, benzaldehyde, tolualdehyde, and salicylaldehyde, and an acid catalyst, the alkyl aldehyde being present in the proportions of from 0.9 to 1.05 moles per mole of phenol and said cyclic aldehyde being present in the proportion of from 0.45 to 0.60 mole per mole of phenol; admixing with the partially condensed product thus produced between 8 and 30 percent by weight, based on the phenol employed, of a lignin compound selected from the class consisting of the alkali metal salts of lignin and sulfonated lignin and heating the mixture thus produced at a temperature of between about 120° and 160° F. for about 0.5 hour; cooling the resulting reaction product; adjusting the pH value thereof, as necessary to between 4.75 and 5.25; substantially filling the interior of said hollow article with the mixture; applying pressure on the mixture in the article whereby some of said mixture is forced into pores in the metal; releasing the pressure and pouring the excess mixture from said hollow article; and subjecting the article thus treated to sufficient heat to set said resin.

12. The method of claim 11 wherein a resin-setting catalyst is admixed with the lignin-containing reaction product prior to pouring into the article being treated.

13. The method of claim 11 wherein the interior of the hollow article is rinsed with water following the pouring of the excess reaction product therefrom and prior to subjecting the article thus treated to heat.

14. The method of claim 13 wherein heating of the treated metal article is carried on at about 200° F. for about 16 hours.

References Cited in the file of this patent

UNITED STATES PATENTS

| | | |
|---|---|---|
| 1,672,280 | Peterson | June 5, 1928 |
| 2,159,411 | Wallace | May 23, 1939 |
| 2,878,197 | Baxter et al. | Mar. 17, 1959 |
| 2,930,106 | Wrotnowski | Mar. 29, 1960 |

FOREIGN PATENTS

| | | |
|---|---|---|
| 122,849 | Australia | Dec. 5, 1946 |
| 484,248 | Great Britain | May 3, 1938 |
| 530,007 | Great Britain | Dec. 3, 1940 |